Aug. 24, 1926. Re. 16,406
B. D. BARTON
PRIMER FOR CENTRIFUGAL PUMPS
Original Filed Jan. 28, 1924
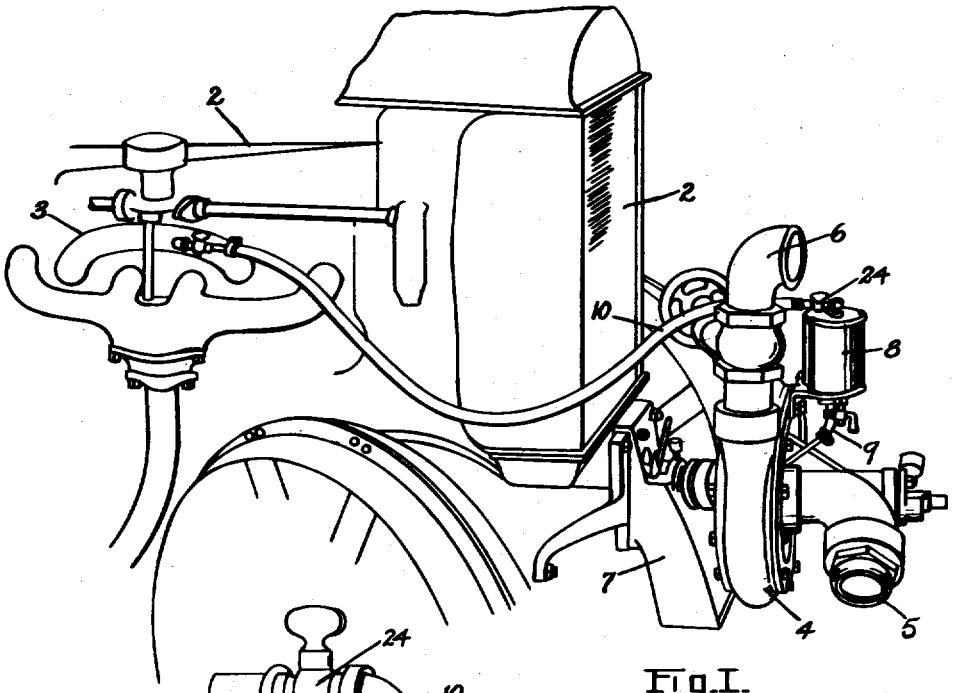
Fig. I.
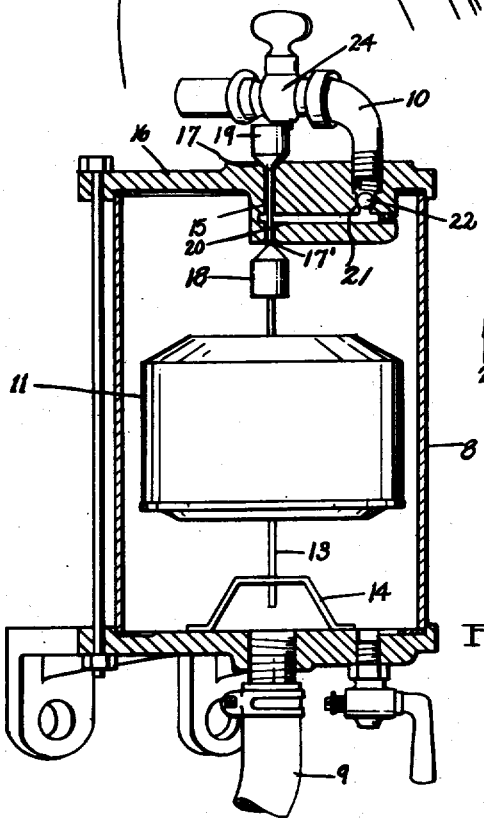
Fig. II.
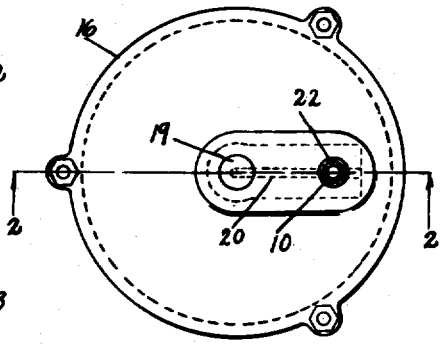
Fig. III.
INVENTOR
Ben D. Barton
By H. Brandert Boxell
ATTORNEYS Reissued Aug. 24, 1926. Re. 16,406

UNITED STATES PATENT OFFICE.

BEN D. BARTON, OF BATTLE CREEK, MICHIGAN, ASSIGNOR TO AMERICAN STEAM PUMP COMPANY, OF BATTLE CREEK, MICHIGAN, A CORPORATION OF MICHIGAN.

PRIMER FOR CENTRIFUGAL PUMPS.

Original No. 1,551,262, dated August 25, 1925, Serial No. 689,151, filed January 26, 1924. Application for reissue filed January 11, 1926. Serial No. 80,679.

This invention relates to improvements in primers for centrifugal pumps.

My present improvements are especially designed by me for use in connection with my pump attachment for motor vehicles shown in my application for Letters Patent filed December 7, 1923, Serial No. 679,236, and I have illustrated the same as embodied in practice in such apparatus. My improvements are, however, adapted for use in other relations, particularly where a centrifugal pump is driven from an internal combustion engine.

The main objects of this invention are:

First, to provide an improved priming mechanism for centrifugal pumps which is automatic in its operation.

Second, to provide an improved priming mechanism for centrifugal pumps which is adapted to meet varying conditions in operating the pump, for instance, such as the temporary exhaustion of the source of supply.

Third, to provide an improved priming means of the class described which requires no attention on the part of the operator and is not likely to become inoperative or get out of repair when in use.

Objects pertaining to details and economies of construction and operation will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawings forming a part of this application, in which:

Figure I is a fragmentary perspective view of a tractor equipped with a pump attachment embodying the features of my invention.

Figure II is a detail view partially in vertical section on a line corresponding to line 2—2 of Figure III.

Figure III is a plan view of the parts shown in Figure II, the suction conduit being sectioned.

In the drawing similar reference numerals refer to similar parts in all of the views and the sectional view is taken looking in the direction of the little arrows at the end of the section line.

Referring to the drawing, 1 represents a tractor generally and 2 the engine thereof. The intake manifold 3 of the engine is shown in conventional form.

The centrifugal pump 4 is provided with an intake 5 and discharge 6. This pump is mounted upon the tractor by means of the supporting frame 7, the frame illustrated being that shown in my above mentioned application.

I provide a float chamber 8 which is connected to the interior of the pump by means of the conduit 9, the connection 9 being to the bottom of the float chamber and to the pump at a central point. The top of the float chamber is connected to the intake manifold by the conduit 10.

The float 11 has a stem 13 guided by the guide 14 at the bottom and in the passage 15 in the top 16 of the float chamber. The passage 15 opens into the chamber and also to the outside thereof. It is provided with valve seats 17 and 17′ for the valves 18 and 19 carried by the stem 13 and adapted to seat alternately, that is, when the suction valve 18 is closed by the raising of the float, the vent valve 19 is opened and vice versa.

The conduit 10 is connected to this passage 15 by a passage 20 formed in the top 16 and having a valve seat 21 therein for the ball check valve 22. This insures the maximum lift in the primer as the valve seats effectively with each impulse and a steady vacuum is maintained.

With the parts thus arranged, the operation is as follows: When the engine is started the suction in the intake manifold will draw the air from the pump and the suction line, assuming, of course, that the line is at that time sealed by water, water is carried up into the pump and into the float chamber, raising the float and closing the valve 18, thus preventing the water being drawn into the engine. The vent valve 19 is opened so that air is drawn from the outside into the engine through the conduit, the main object of this, however, being to prevent the valve being hung up by the suction in the event that the water should be drawn from the float chamber.

The check valve 22 is provided to prevent a backward current through the pipe 10 in the event that the suction within the pump should be greater than that in the intake manifold.

My improved primer is very efficient and is entirely automatic in its operation. By connecting the float chamber to the center of the pump the pump may be primed while in operation and the priming automatically maintained during the priming operation. For instance, should there be leaks in the suction line or breaks in the suction admitting air to the pump, the pump does not become air-bound, as the air is constantly exhausted while the pump is in operation. This also avoids the necessity for the use of a foot valve in the suction line, the pump being primed without the use of such valve. The valve 24 is provided in the conduit 10 so that, if desired, after the pump has been primed this conduit can be manually closed, but it is found that in practice it is not necessary to do this.

I have illustrated and described my improvements in an embodiment which I have found very satisfactory. I have not attempted to illustrate certain modifications and adaptations which I contemplate as I believe the disclosure made will enable those skilled in the art to embody or adapt my improvements as may be desired.

I claim:

1. In a structure of the class described, the combination with a chassis, a centrifugal pump mounted thereon, an internal combustion engine mounted on the chassis, and connections for driving said pump from said engine; of a float chamber having its lower end connected to said pump and its upper end connected by a suction line to the intake manifold of said engine, a float in said chamber, and a valve in said float chamber controlled by said float for closing said suction line connection; and a check valve to prevent back flow of gas from the manifold into the float chamber, said check valve being unaffected by the operation of the float.

2. In a structure of the class described, the combination with a chassis, a centrifugal pump mounted thereon, an internal combustion engine mounted on the chassis, and connections for driving said pump from said engine; of a float chamber having an outlet in its lower end connected to said pump, and an outlet in its upper end connected by a suction line to the intake manifold of said engine; a float in said chamber; a valve in the float chamber for said suction line controlled by said float; and a separate vent valve also controlled by said float for admitting air into the suction line when the suction line valve is closed; said vent valve opening and closing alternately with said suction line valve.

3. In a structure of the class described, the combination with a chassis, a centrifugal pump mounted thereon, an internal combustion engine mounted on the chassis, and connections for driving said pump from said engine; of a float chamber having an outlet in its lower end connected to said pump, and an outlet in its upper end connected by a suction line to the intake manifold of said engine; a float in said chamber; a valve in the float chamber for said suction line controlled by said float; a vent valve also controlled by said float for admitting air into the suction line when the suction line valve is closed; said vent valve opening and closing alternately with said suction line valve; and a return check valve in said suction line.

4. In a structure of the class described, the combination with a centrifugal pump and an internal combustion engine for driving said pump; of a float chamber having an opening in its lower end connected to said pump, and an opening in its upper end connected by a suction line to the manifold of said engine; a float in said chamber; a valve controlled by said float for closing the suction line; and a separate valve also controlled by the float adapted to admit air into the suction line when the suction outlet valve is closed.

5. In a structure of the class described, the combination with a centrifugal pump and an internal combustion engine for driving said pump; of a float chamber having an opening connected to said pump and an opening connected by a suction line to the intake manifold of said engine; a float in said chamber, a valve in said chamber for closing said suction line opening controlled by said float, and a vent valve also controlled by said float and adapted to admit air into the said suction line when the suction line valve in the float chamber is closed, said vent valve opening and closing alternately with said suction line valve.

6. In a structure of the class described, the combination with a centrifugal pump and an internal combustion engine for driving said pump; of a float chamber having an opening below the float connected to said pump, and an opening above the float connected by a suction line to the intake manifold of said engine; a float in said chamber, a valve in said chamber for the suction line opening controlled by said float; and a vent valve also controlled by the float and adapted to admit air into the suction line when the suction line valve is closed, said vent valve being automatically closed by the lowering of the float to open the suction line valve in the float chamber, and automatically opened by the raising of the float to close the suction line valve.

7. In a structure of the class described, the combination with a centrifugal pump and an internal combustion engine for driving said pump; of a float chamber having an opening adjacent its lower end connected to said pump; and an opening adjacent its upper end connected by a suction line to the intake manifold of said engine; a float in said chamber; a valve in said chamber for said suction line opening controlled by said float; and a vent valve controlled by the float adapted to admit air into the suction line when the suction line valve in the float chamber is closed; said vent valve being automatically operated by the float to open and close alternately with said suction line closing valve; and a return check valve in said suction line.

8. In a structure of the class described, the combination with a centrifugal pump and the intake of an internal combustion engine, of a float chamber connected to said engine intake and to said pump at a central point thereof, a float in said chamber, and a valve for said intake connection actuated by said float.

9. In a structure of the class described, the combination with a centrifugal pump and an internal combustion engine for driving said pump, of a float chamber having its lower end connected to said pump at a central point thereof, and its upper end connected to the intake of said engine, a float in said chamber, and a float chamber valve for said intake connection controlled by said float.

10. In a structure of the class described, the combination with a centrifugal pump and an internal combustion engine for driving said pump, of a float chamber having its lower end connected to said pump at a central point thereof and its upper end connected to the intake of said engine, a float in said chamber, a float chamber valve for said intake connection controlled by said float, and a return check valve in said intake connection.

11. In a structure of the class described, the combination with a centrifugal pump and an internal combustion engine for driving said pump, of a float chamber having its lower end connected to said pump at a central point thereof and its upper end connected to the intake of said engine, a float in said chamber, a float chamber valve for said intake connection controlled by said float and a vent valve for said intake connection controlled by said float and opening and closing alternately with said float chamber valve.

12. In a structure of the class described, the combination with a centrifugal pump and an internal combustion engine for driving said pump, of a float chamber having its lower end connected to said pump at a central point thereof and its upper end connected to the intake of said engine, a float in said chamber, a float chamber valve for said intake connection controlled by said float, a vent valve for said intake connection controlled by said float and opening and closing alternately with said float chamber valve, and a return check valve in said intake connection.

13. A float chamber having an inlet opening in its lower end, an opening in its upper end adapted to be connected to a suction line, and an air passage connecting with the suction line; a float in said chamber, a valve in said chamber controlled by said float for closing the opening in said chamber which communicates with said suction line opening and a vent valve in said passage also controlled by said float to admit air through said air passage into the suction line when the suction line valve in the float chamber is closed, said vent valve opening and closing alternately with said suction line valve.

14. A float chamber having an opening in its lower end adapted to be connected to a pump, an opening in its upper end adapted to be connected by a suction line to the manifold of an internal combustion engine and an air passage connecting with the suction line; a float in said chamber; a valve controlled by said float for closing the suction line opening; and a valve for said air passage controlled by the float adapted to admit air into the suction line through said air passage when the suction outlet valve is closed.

15. A float chamber having an opening adjacent its lower end adapted to be connected to a pump, an opening adjacent its upper end adapted to be connected to a suction line, and an air passage connecting with the suction line; a float in said chamber; a valve in said chamber for said suction line opening controlled by said float; a vent valve in said passage also controlled by the float adapted to admit air into the suction line when the suction line valve in the float chamber is closed; said vent valve being automatically operated by the float and opening and closing alternately with said suction line valve; and a return check valve in the suction line.

BEN D. BARTON.